(12) United States Patent
Okuno (10) Patent No.: US 9,105,267 B2
(45) Date of Patent: Aug. 11, 2015

(54) SPEECH RECOGNITION APPARATUS

(71) Applicant: DENSO CORPORATION, Aichi-Pref. (JP)

(72) Inventor: Hiroyuki Okuno, Nagoya (JP)

(73) Assignee: DENSO CORPORATION, Kariya (JP)

( * ) Notice: Subject to any disclaimer, the term of this patent is extended or adjusted under 35 U.S.C. 154(b) by 295 days.

(21) Appl. No.: 13/727,250

(22) Filed: Dec. 26, 2012

(65) Prior Publication Data

US 2013/0179154 A1    Jul. 11, 2013

(30) Foreign Application Priority Data

Jan. 5, 2012 (JP) .................................... 2012-543

(51) Int. Cl.
| | | |
|---|---|---|
| *G06F 17/21* | (2006.01) | |
| *G10L 15/22* | (2006.01) | |
| *G10L 15/32* | (2013.01) | |
| *G10L 15/30* | (2013.01) | |

(52) U.S. Cl.
CPC ................. *G10L 15/22* (2013.01); *G10L 15/30* (2013.01); *G10L 15/32* (2013.01)

(58) Field of Classification Search
CPC ......... G10L 15/00; G10L 15/01; G10L 15/18; G10L 15/187; G10L 15/26; G10L 15/28; G10L 15/30; G10L 15/32; G10L 2015/00; G10L 2015/25; G10L 2015/22; G10L 2015/28; G06F 17/21; G06F 17/27; G06F 17/2735; G06F 17/2765; G06F 17/30
USPC ............................. 704/10, 231, 235, 251, 270
See application file for complete search history.

(56) References Cited

U.S. PATENT DOCUMENTS

| | | |
|---|---|---|
| 2002/0193991 A1 | 12/2002 | Bennett et al. |
| 2007/0027693 A1 | 2/2007 | Hanazawa |
| 2010/0057450 A1 | 3/2010 | Koll |

(Continued)

FOREIGN PATENT DOCUMENTS

| | | |
|---|---|---|
| JP | 2003-256458 A | 9/2003 |
| JP | 2006-3696 A | 1/2006 |
| JP | B2-3862169 | 12/2006 |
| JP | 2010-85536 A | 4/2010 |

OTHER PUBLICATIONS

Extended Search Report dated Jun. 5, 2013 in the corresponding EP application No. 13150079.5 (English translation).

(Continued)

*Primary Examiner* — Qi Han
(74) *Attorney, Agent, or Firm* — Posz Law Group, PLC (57) ABSTRACT

A speech recognition apparatus includes a first recognition dictionary, a speech input unit, a speech recognition unit, a speech transmission unit, a recognition result receipt unit, and a control unit. The speech recognition unit recognizes a speech based on a first recognition dictionary, and outputs a first recognition result. A server recognizes the speech based on a second recognition dictionary, and outputs a second recognition result. The control unit determines a likelihood level of a selected candidate obtained based on the first recognition result, and accordingly controls an output unit to output at least one of the first recognition result and the second recognition result. When the likelihood level of the selected candidate is equal to or higher than a threshold level, the control unit controls the output unit to output the first recognition result irrespective of whether the second recognition result is received from the server.

13 Claims, 9 Drawing Sheets

(56) References Cited

U.S. PATENT DOCUMENTS

| | | | |
|---|---|---|---|
| 2010/0057457 A1* | 3/2010 | Ogata et al. | 704/235 |
| 2010/0106497 A1 | 4/2010 | Phillips | |
| 2011/0015928 A1* | 1/2011 | Odell et al. | 704/257 |
| 2011/0238415 A1 | 9/2011 | Koll | |
| 2012/0232893 A1* | 9/2012 | Lee et al. | 704/231 |
| 2012/0296644 A1 | 11/2012 | Koll | |
| 2013/0151250 A1* | 6/2013 | VanBlon | 704/235 |

OTHER PUBLICATIONS

Office Action dated Jan. 12, 2015 in the corresponding EP application No. 13150079.5.

Office Action mailed Jan. 13, 2015 in the corresponding JP application No. 2012-543 (and English translation).

* cited by examiner

FIG. 13

SPEECH RECOGNITION APPARATUS

CROSS REFERENCE TO RELATED APPLICATION

This application is based on Japanese Patent Application No. 2012-000543 filed on Jan. 5, 2012, the disclosure of which is incorporated herein by reference.

TECHNICAL FIELD

The present disclosure relates to a speech recognition apparatus, which recognizes a speech based on a recognition dictionary that includes phoneme strings converted from text data.

BACKGROUND

A speech recognition apparatus is widely used in an in-vehicle navigation apparatus that has a speech recognition function. When recognizing a music, a facility name, a place name, and a phonebook record, a high recognition accuracy of recognition is required. For example, in JP 3862169 B2, a server that has a higher recognition accuracy than a speech recognition apparatus is coupled to the speech recognition apparatus. In this configuration, the server receives a speech from the speech recognition apparatus to which the speech is input, and recognizes the speech. The speech recognition apparatus outputs a recognition result of the speech, which is recognized by the server.

In the above-described configuration, the speech and the recognition result are transmitted and received between the speech recognition apparatus and the server. Thus, a time that is necessary for transmitting and receiving the speech and the recognition result increases. A higher recognition accuracy, that is higher than a recognition accuracy recognized by the speech recognition apparatus, is required to be provided to a user and a recognition result recognized by the speech recognition apparatus is required to be provided to the user at a high speed. Providing the recognition result at a high speed signifies processing speech data of the speech at a high speed.

SUMMARY

In view of the foregoing difficulties, it is an object of the present disclosure to provide a speech recognition apparatus, which provides a recognition accuracy that is higher than a recognition accuracy of the speech recognition apparatus and provides a recognition result of the speech recognition apparatus to the user at a high speed.

According to an aspect of the present disclosure, a speech recognition apparatus includes a first recognition dictionary, a speech input unit, a speech recognition unit, a speech transmission unit, a recognition result receipt unit, and a control unit. The first recognition dictionary stores a plurality of first phoneme strings, which are respectively converted from a plurality of text data. The speech input unit inputs a speech made by a user. The speech recognition unit recognizes the speech based on the first recognition dictionary and outputs a first recognition result. The speech transmission unit transmits the speech to a server, which includes a second recognition dictionary that stores a plurality of second phoneme strings respectively converted from the plurality of text data. The server recognizes the speech based on the second recognition dictionary and outputs a second recognition result. The recognition result receipt unit receives the second recognition result from the server. The control unit determines a likelihood level of a selected candidate obtained based on the first recognition result, and controls an output unit to output at least one of the first recognition result and the second recognition result based on a determination result of the likelihood level of the selected candidate. When the control unit determines that the likelihood level of the selected candidate is equal to or higher than a threshold level, the control unit controls the output unit to output the first recognition result irrespective of whether the recognition result receipt unit receives the second recognition result from the server.

In the above apparatus, the control unit determines the likelihood level of the selected candidate obtained based on the first recognition result, and controls the output unit to output at least one of the first recognition result and the second recognition result based on the determination result of the likelihood level of the selected candidate. Thus, the second recognition result having a higher recognition accuracy than the first recognition result is provided to the user. Further, when the control unit determines that the likelihood level of the selected candidate is equal to or higher than the threshold level, the control unit controls the output unit to output the first recognition result irrespective of whether the recognition result receipt unit receives the second recognition result from the server. Thus, the first recognition result of the speech is provided to the user at a high speed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
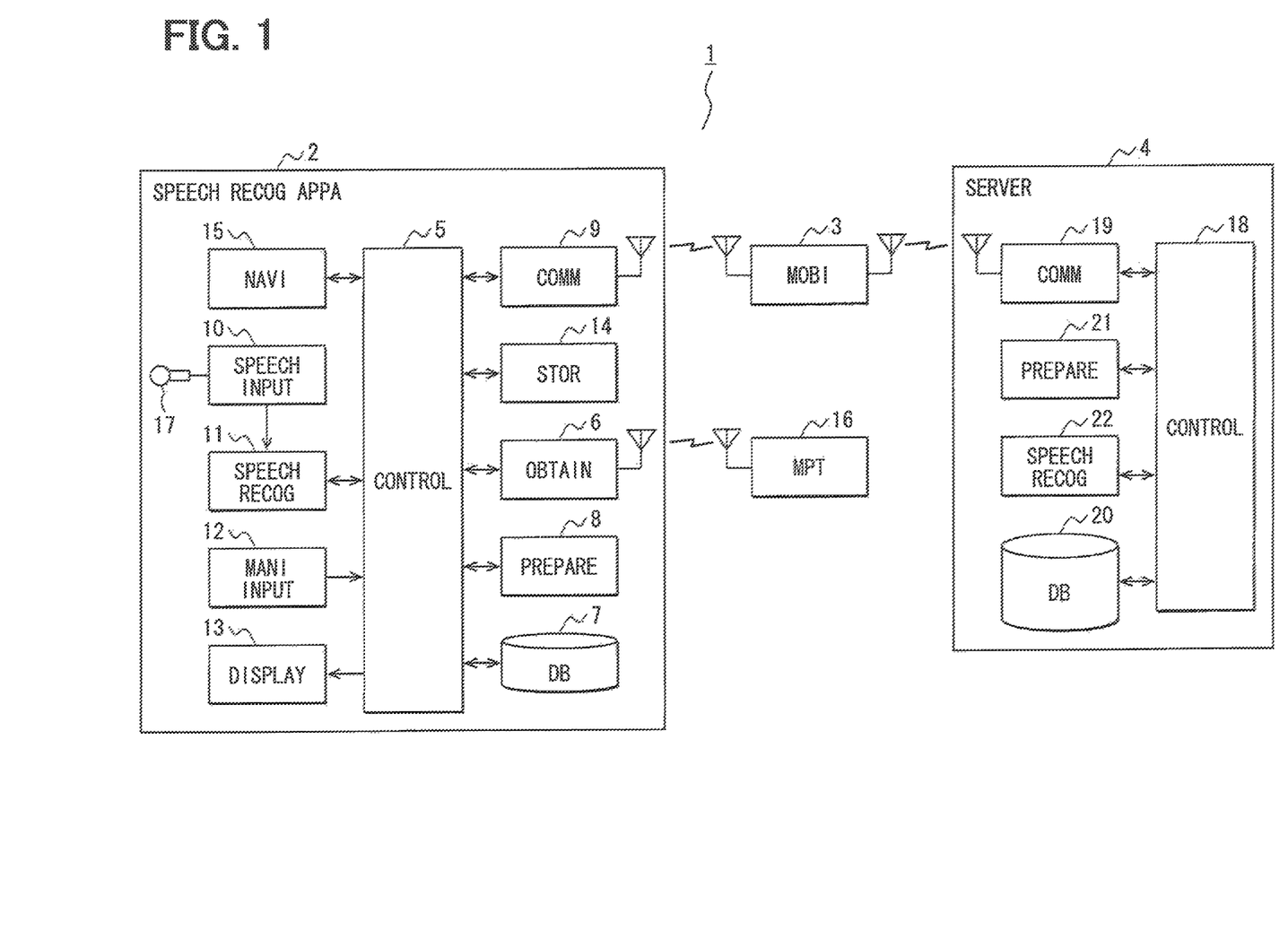
FIG. 1 is a block diagram showing a configuration of a speech recognition system according to an embodiment of the present disclosure.

The following will describe a speech recognition apparatus that is applied to an in-vehicle navigation apparatus 2 according to an embodiment of the present disclosure with reference to the drawings. A speech recognition system 1 includes a speech recognition apparatus (SPEECH RECOG APPA) that is applied to an in-vehicle navigation apparatus 2, a mobile phone (MOBI) 3, and a server 4. The mobile phone 3 is communicably coupled with the in-vehicle navigation apparatus 2. The server 4 is communicably coupled with the mobile phone 3. The in-vehicle navigation apparatus 2 may be a non-portable navigation apparatus that is fixed to a vehicle or a portable navigation apparatus that is removable from the vehicle.

As shown in FIG. 1, the in-vehicle navigation apparatus 2 includes a control unit (CONTROL) 5, a music data obtaining unit (OBTAIN) 6, a music database (DB) 7, a recognition dictionary preparation unit (PREPARE) 8, a communication unit (COMM) 9, a speech input unit (SPEECH INPUT) 10, a speech recognition unit (SPEECH RECOG) 11, a manipulation input unit (MANI INPUT) 12, a display unit (DISPLAY) 13, a storage unit (STOR) 14, and a navigation function unit (NAVI) 15. The music data obtaining unit 6 may also operate as a text data obtaining unit. The communication unit 9 may also operate as a text data transmission unit, a speech data transmission unit, and a recognition result receipt unit. The display unit 13 may also operate as an output unit.

The control unit 5 includes a central processing unit (CPU) that is provided by a well-known microcomputer, a random access memory (RAM), a read-only memory (ROM), and an input/output bus. The control unit 5 executes a control program in order to control an operation of the in-vehicle navigation apparatus 2. The music data obtaining unit 6 communicates with a music play terminal (MPT) 16, which is also know as a music player, based on a Bluetooth (registered trademark) standard, a universal serial bus (USB) standard and the like in order to obtain music data that are stored in the music play terminal 16. The music data are also referred to as text data. Each of the music data includes a title data element, an artist data element, an album name data element and the like.

The recognition dictionary preparation unit 8 performs a grapheme to phoneme (G2P) conversion. The recognition dictionary preparation unit 8 compares a music data obtained by the music data obtaining unit 6 from the music play terminal 16 with each of music data stored in the music database 7. The music database 7 is also referred to as a local database. Then, the recognition dictionary preparation unit 8 performs the G2P conversion to convert the obtained music data to a phoneme string when the obtained music data is the same with one of the stored music data, and stores the converted phoneme string in the recognition dictionary. In this case, the recognition dictionary is also referred to as a first recognition dictionary. For example, the communication unit 9 may have a Bluetooth function, and is communicable with the mobile phone 3 based on Bluetooth standard. The speech input unit 10 collects a speech made by a user via a microphone 17, and transmits the speech to the speech recognition unit 11. When receiving the speech from the speech input unit 10, the speech recognition unit 11 recognizes the speech based on the first recognition dictionary prepared by the recognition dictionary preparation unit 8, and transmits a recognition result to the control unit 5. The recognition result output from the speech recognition unit 11 of the in-vehicle navigation apparatus 2 is referred to as a first recognition result hereinafter.

The manipulation input unit 12 is provided by a touch switch panel disposed on the display unit 13. When the user manipulates the manipulation input unit 12 in order to, for example, set a destination, set a map scale, and set a sound volume, the manipulation input unit 12 transmits, to the control unit 5, a signal corresponding to the manipulation performed by the user. The display unit 13 is provided by such as a liquid crystal display, and displays one or more display windows including a menu window, a map window, a destination setting window, a music search window 31, and a recognition result window 32, 33, 34. The music search window 31 and the recognition result window 32, 33, 34 will be described in detail later. Further, the display unit 13 may be provided by an organic electro-luminescence display, a plasma display and the like. The storage unit 14 is provided by a storage media having a large-capacity such as a hard disk drive (HDD) in order to store multiple data having large-sizes.

The navigation function unit 15 includes a global positioning system (GPS) receiver, an accelerometer that is known as a G-sensor, a gyroscope, and a distance sensor. The navigation function unit 15 has normal functions of a navigation device. For example, the navigation function unit 15 reads a map data from a storage media in which the map data is stored; performs a map matching to specify a road on which a present position of the vehicle exists based on the present position of the vehicle and road data included in the map data; searches for a route from the present position specified by the map matching to a destination set by the user; guides the route to the user by calculating positions at which guidance is necessary based on route data of the route from the present position to the destination, road data, and position data of intersections; prepares a map around the present position, a simplified map of a highway system, and an enlarged map around an intersection.

The server 4 includes a control unit (CONTROL) 18, a communication unit (COMM) 19, a music database (DB) 20, a recognition dictionary preparation unit (PREPARE) 21, and a speech recognition unit (SPEECH RECOG) 22. The control unit 18 includes a CPU that is provided by a well-known microcomputer, a RAM, a ROM, and an input/output bus. The control unit 18 executes a control program in order to control an operation of the server 4. The communication unit 19 performs a wide area communication with the mobile phone 3. The wide area communication includes a mobile communication and a fixed-line communication.

The recognition dictionary preparation unit 21 performs the G2P conversion. The recognition dictionary preparation unit 21 compares a music data, which is received by the communication unit 19 from the in-vehicle navigation apparatus 2 via the mobile phone 3, with each of music data stored in the music database 20. Herein, the music database 20 is also referred to as a server database. Then, the recognition dictionary preparation unit 21 performs the G2P conversion to convert the received music data to a phoneme string when the received music data is the same with one of the stored music data, and stores the converted phoneme string in the recognition dictionary. In this case, the recognition dictionary is also referred to as a second recognition dictionary. When the communication unit 19 receives the speech from the in-vehicle navigation apparatus 2 via the mobile phone 3, the speech recognition unit 22 recognizes the speech based on the second recognition dictionary prepared by the recognition dictionary preparation unit 21, and transmits a recognition result to the control unit 18. The recognition result output from the speech recognition unit 22 of the server 4 is referred to as a second recognition result hereinafter.

In the above-described configuration, a storing capacity of the music database 20 of the server 4 is substantially, larger than a storing capacity of the music database 7 of the in-vehicle navigation apparatus 2. That is, the stroing capacity of the server database 20 is substantially larger than the storing capacity of the local database. Further, the server database 20 stores some music data such as latest music data that are not yet stored in the local database 7. Thus, the second recognition dictionary prepared by the recognition dictionary preparation unit 21 of the server 4 has a recognition accuracy higher than a recognition accuracy of the first recognition dictionary prepared by the recognition dictionary preparation unit 8 of the in-vehicle navigation apparatus 2. In general specifications, a recognition performance of the speech recognition unit 22 of the server 4 is higher than a recognition performance of the speech recognition unit 11 of the in-vehicle navigation apparatus 2. The recognition performance includes a setting value of a parameter and the number of similar words or other names. Thus, the speech recognition unit 22 of the server 4 has a recognition accuracy higher than a recognition accuracy of the speech recognition unit 11 of the in-vehicle navigation apparatus 2.

The following will describe an operation of the speech recognition system 1 with reference to FIG. 2 to FIG. 13. First, a process executed by the control unit 5 of the in-vehicle navigation apparatus 2 will be described with reference to FIG. 2. At A1, when the control unit 5 determines that the music data obtaining unit 6 obtains the music data from the music play terminal 16 carried into the vehicle (A1: YES), the control unit 5 controls the communication unit 9 to transmit the obtained music data to the server 4 via the mobile phone 3 at A2. Then, the control unit 5 controls the recognition dictionary preparation unit 8 to compare the obtained music data with each music data stored in the music database 7 at P3. When the control unit 5 determines that one of the music data stored in the music database 7 is the same with the obtained music data, the control unit 5 controls the recognition dictionary preparation unit 8 to perform the G2P conversion to the one of the music data stored in the music database 7, and stores the converted phoneme string in the first recognition dictionary at A4.

Figure 3:
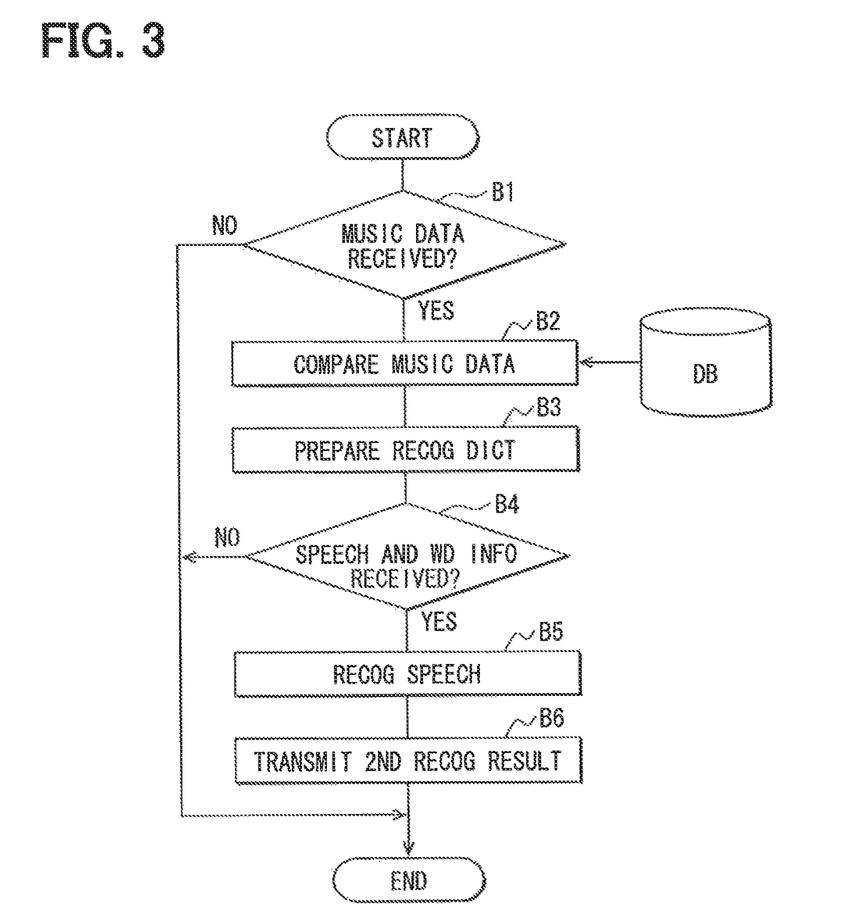
FIG. 3 is a flowchart of a speech recognition process executed by a server.

The following will describe a process executed by the control unit 18 of the server 4 with reference to FIG. 3. When the control unit 18 determines that the communication unit 19 receives the music data from the in-vehicle navigation apparatus 2 via the mobile phone 3 (B1: YES), the control unit 18 controls the recognition dictionary preparation unit 21 to compare the received music data with each music data stored in the music database 20 at B2. When the control unit 18 determines that one of the music data stored in the music database 20 is the same with the received music data, the control unit 18 controls the recognition dictionary preparation unit 21 to perform the G2P conversion to the one of the music data stored in the music database 20, and stores the converted phoneme string in the second recognition dictionary at B3.

Figure 2:
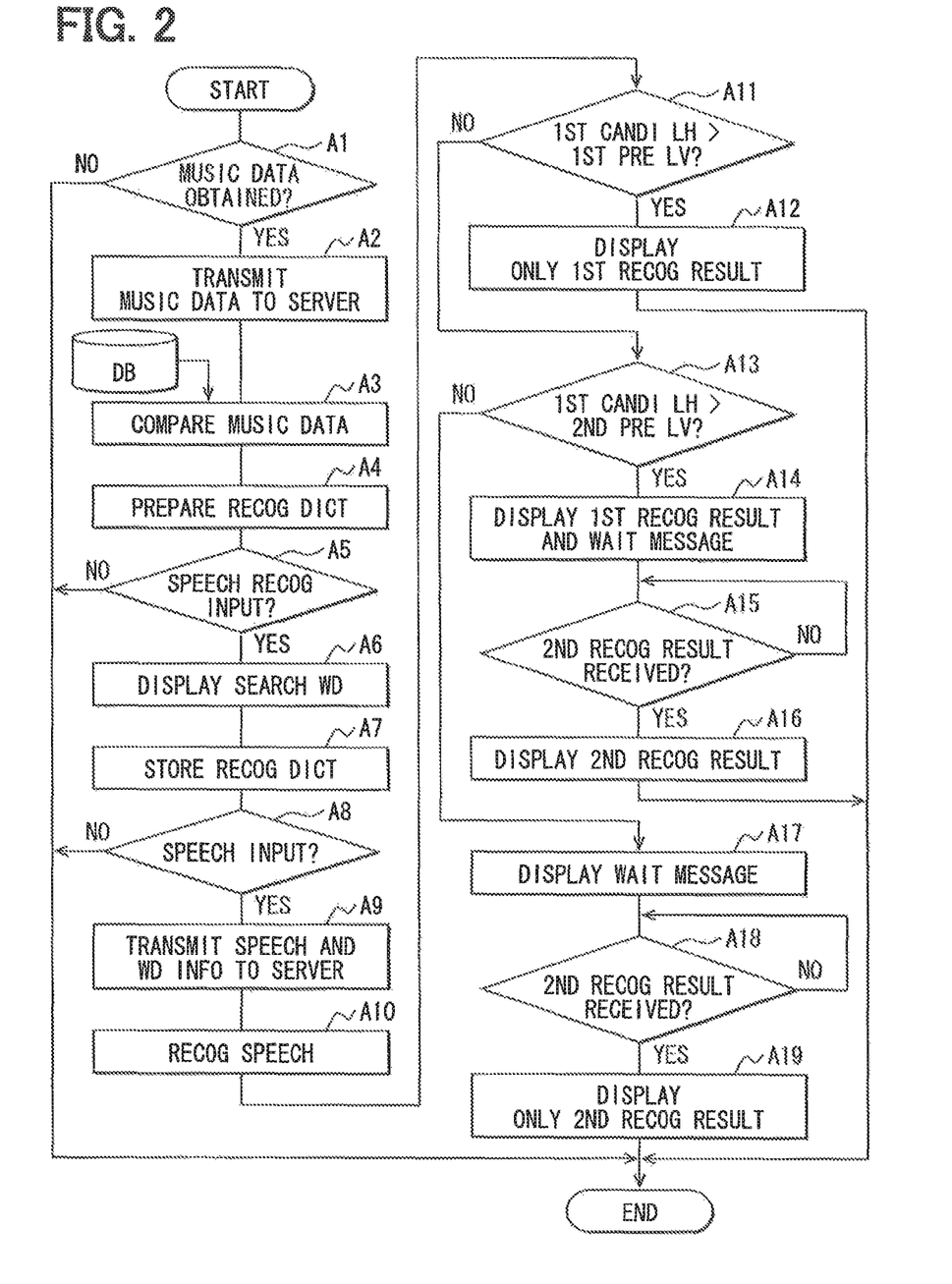
FIG. 2 is a flowchart of a speech recognition process executed by a speech recognition apparatus.
Figure 5:
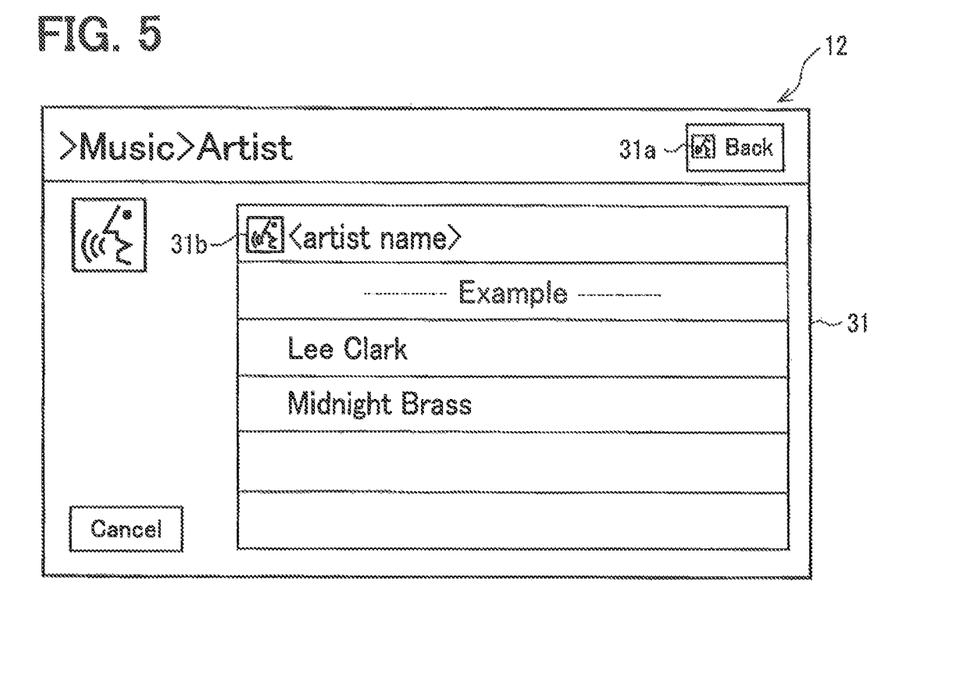
FIG. 5 is a diagram showing an exemplary recognition result window.

In the in-vehicle navigation apparatus 2, after the control unit 5 controls the recognition dictionary preparation unit 8 to prepare the first recognition dictionary, the control unit 5 determines whether a speech recognition manipulation is input by the user via the manipulation input unit 12 at A5. At A5, when the control unit 5 determines that the speech recognition manipulation is input by the user via the manipulation input unit 12 (A5: YES), the control unit 5 controls the display unit 13 to display the music search window 31 at A6 as shown in FIG. 5. Further, at A7, the control unit 5 stores a previous first recognition dictionary that is previously prepared in a speech recognition engine. The speech recognition engine is a tool for recognizing a speech. The control unit 5 controls the display unit 13 to display a back icon 31a and an artist icon 31b on the music search window 31. The back icon 31a notifies to the user that the user can make a speech of going back to a previous window. The artist icon 31b notifies to the user that the user can make a speech of a name of an artist such as "Lee Clark" and "Midnight Brass".

At A8, when the control unit 5 determines that a speech of an artist name, which is made by the user, is input to the speech input unit 10 (A8: YES), the control unit 5 specifies a present music search window 31 corresponding to the speech made by the user. Then, at A9, the control unit 5 controls the communication unit 9 to transmit the speech of the artist name made by the user and the specified present music search window 31 corresponding to the speech made by the user to the server 4 via the mobile phone 3. At A10, the speech recognition unit 11 recognizes the speech of the artist name made by the user. In this case, the control unit 5 notifies to the server 4 that the speech made by the user is an artist name by transmitting the specified present music search window 31 on which artist names are displayed to the server 4 via the mobile phone 3. That is, the control unit 5 notifies a type of the speech made by the user to the server 4 by transmitting the specified present music search window 31 to the server 4 via the mobile phone 3. Herein, the type of the speech may include a title, an artist name, and an album name. Further, when the control unit 5 determines that the speech of going back to the previous window, which is made by the user, is input to the speech input unit 10, the control unit 5 controls the display unit 13 to display the previous window. In this case, the control unit 5 may control the communication unit 9 to transmit the speech made by the user to the server 4 via the mobile phone 3. Further, the control unit 5 may skip this transmission process of the speech made by the user to the server 4 via the mobile phone 3.

In the server 4, at B4, when the control unit 18 determines that the speech made by the user and the specified present music search window 31 corresponding to the speech are received by the communication unit 19 via the mobile phone 3 (B4: YES), the speech recognition unit 22 recognizes the speech made by the user at B5. Since, receiving all data of the speech made by the user needs a period of time, the speech recognition unit 22 of the server 4 starts to recognize the speech later than the speech recognition unit 11 of the in-vehicle navigation apparatus 2.

In the in-vehicle navigation apparatus 2, when the control unit 5 determines that the speech recognition unit 11 finished recognizing the speech, the control unit 5 determines the first recognition result output from the speech recognition unit 11 at A11. Specifically, among one or more candidates obtained based on the first recognition result, the control unit 5 determines whether a maximum likelihood level (LH) of one of the candidates is equal to or higher than a first predetermined level. Herein, the first predetermined level is also referred to as a threshold level. In this case, the maximum likelihood level is a likelihood level of a first candidate. That is, the first candidate has the maximum likelihood level, and is also referred to as a selected candidate. The candidates obtained based on the first recognition result are also referred to as a first candidate group. Herein, the likelihood is a unique value of each candidate that is determined based on a feature of the speech recognition engine. The likelihood level indicates a recognition accuracy of a corresponding candidate. That is, the likelihood level indicates a credibility of the corresponding candidate. The candidate is more similar to the speech made by the user when the likelihood level is higher, and less similar to the speech made by the user when the likelihood level is lower. That is, the credibility of the candidate increases with an increase of the likelihood level, and decreases with a decrease of the likelihood level. The first predetermined level and a second predetermined level, which will be described later, may be preliminarily decided by a maker of the in-vehicle navigation apparatus 2. Further, the first predetermined level and the second predetermined level may be set by the user.

In the server 4, when the control unit 18 determines that the speech recognition unit 22 finished recognizing the speech, at 86, the control unit 18 controls the communication unit 19 to transmit the second recognition result to the in-vehicle navigation apparatus 2 via the mobile phone 3.

Figure 6:
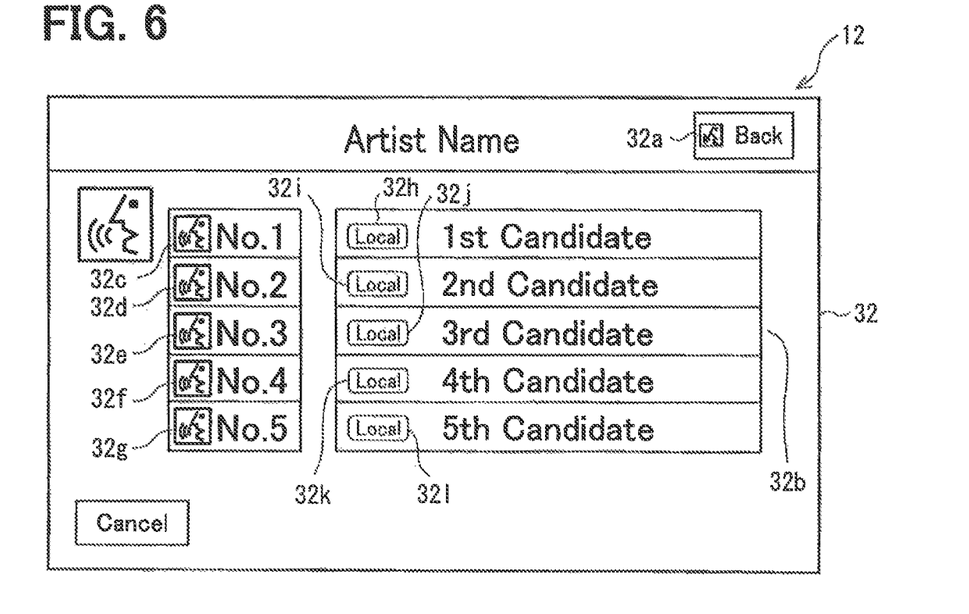
FIG. 6 is a diagram showing an exemplary recognition result window.

In the in-vehicle navigation apparatus 2, when the control unit 5 determines that the likelihood level of the first candidate is equal to or higher than the first predetermined level at A11 (A11: YES), the control unit 5 controls the display unit 13 to display only the first recognition result output from the speech recognition unit 11 in a candidate display region 32b of the recognition result window 32 at A12 as shown in FIG. 6. Specifically, the control unit 5 controls the display unit 13 to display the candidates obtained based on the first recognition result in the candidate display region 32b of the recognition result window 32.

As shown in FIG. 6, in the present embodiment, the number of the candidates displayed in the candidate display region 32b of the recognition result window 32 at one time is defined as five. When the number of the candidates is equal to or more than five, the control unit 5 extracts five candidates from all the candidates so that the extracted five candidates have top five likelihood levels. Further, the first candidate to a fifth candidate are defined in a decreasing order of the likelihood levels, and are displayed in the candidate display region 32b of the recognition result window 32 as shown in FIG. 6. The control unit 5 controls the display unit 13 to display a back icon 32a, selection icons 32c to 32g, and local icons 32h to 32l. The back icon 32a notifies to the user that the user can make a speech of going back to the previous window. Each of the selection icons 32c to 32g notifies to the user that the user can make a speech of selecting a corresponding candidate. Each of the local icons 32h to 32l notifies to the user that the corresponding candidate is obtained by the speech recognition unit 11 of the in-vehicle navigation apparatus 2. The local icons 32h to 32l correspond to first identification information, which indicate that the candidates are obtained from the speech recognition unit 11 of the in-vehicle navigation apparatus 2. Further, when the number of the candidates is less than five, the control unit 5 extracts the candidates and defines from the first candidate to a last candidate in a decreasing order of the likelihood levels. Then, the first candidate to the last candidate are displayed in the candidate display region 32b of the recognition result window 32. Then, when the control unit 5 determines that the speech of selecting the corresponding candidate, which is made by the user, is input to the speech input unit 10, the control unit 5 selects the corresponding candidate, and the speech recognition process executed by the control unit 5 of the in-vehicle navigation apparatus 2 ends.

Figure 7:
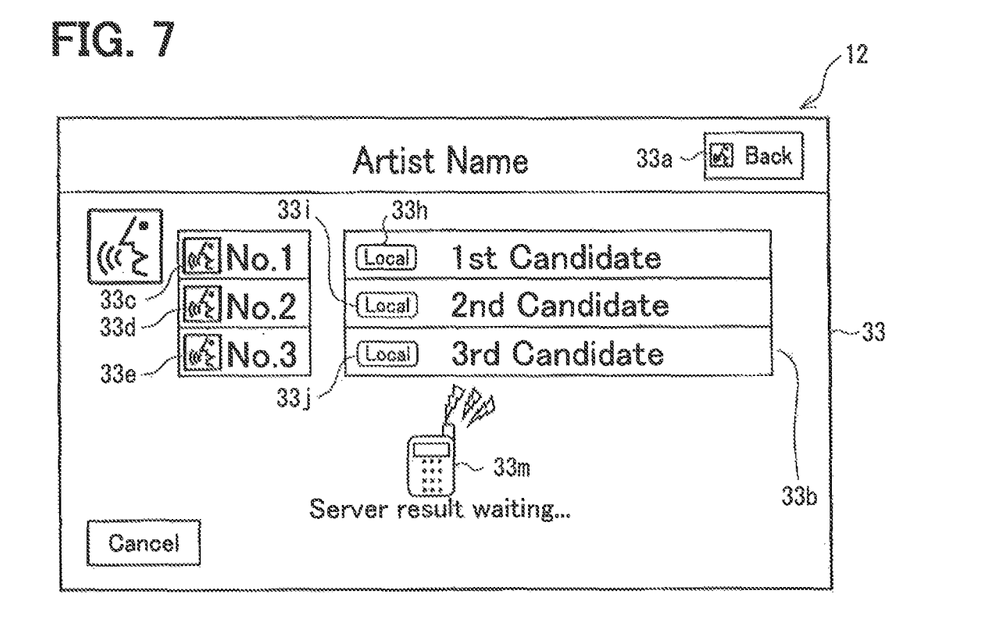
FIG. 7 is a diagram showing an exemplary recognition result window.

In the in-vehicle navigation apparatus 2, when the control unit 5 determines that the likelihood level of the first candidate is lower than the first predetermined level at A11 (A11: NO), the control unit 5 further determines whether the likelihood level of the first candidate is equal to or higher than a second predetermined level at A13. When the control unit 5 determines that the likelihood level of the first candidate is equal to or higher than the second predetermined level at A13 (A13: YES), the control unit 5 controls the display unit 13 to display the first recognition result output from the speech recognition unit 11 in a candidate display region 33b of the recognition result window 33 at A14 as shown in FIG. 7. At the same time, at A14, the control unit 5 controls the display unit 13 to display a message indicating that the control unit 5 waits for receiving the second recognition result from the server 4 until the control unit 5 receives the second recognition result from the server 4. For example, the message may be "Server result waiting . . . ".

As shown in FIG. 7, when the number of the candidates obtained based on the first recognition result is equal to or more than five, the control unit 5 extracts three candidates from all of the obtained candidates so that the three candidates have top three likelihood levels. Then, the control unit 5 defines the first candidate to the third candidate in a decreasing order of the likelihood levels, and controls the display unit 13 to display the three candidates in the candidate display region 33b of the recognition result window 33. In this case, a size of the candidate display region 33b is smaller than a size of the candidate display region 32b. Further, the control unit 5 controls the display unit 13 to display the message indicating that the control unit 5 waits for receiving the second recognition result from the server 4 and a server result waiting icon 33m in the recognition result window 33. Hereinafter, the message indicating that the control unit 5 waits for receiving the second recognition result from the server 4 is also referred to as a sever result waiting message. The control unit 5 may control the display unit 13 to display only one of the sever result waiting message and the server result waiting icon 33m. Further, the control unit 5 controls the display unit 13 to display a back icon 33a, selection icons 33c to 33e, and local icons 33h to 33j. The back icon 33a notifies to the user that the user can make a speech of going back to the previous window. Each of the selection icons 33c to 33e notifies to the user that the user can make a speech of selecting a corresponding candidate. Each of the local icons 33h to 33j notifies to the user that the corresponding candidate is obtained by the speech recognition unit 11 of the in-vehicle navigation apparatus 2. Then, when the control unit 5 determines that the speech of selecting the corresponding candidate, which is made by the user, is input to the speech input unit 10, the control unit 5 selects the corresponding candidate even during a waiting for the second recognition result from the server 4, and the speech recognition process executed by the control unit 5 of the in-vehicle navigation apparatus 2 ends.

When the control unit 5 determines that the second recognition result output from the speech recognition unit 22 of the server 4 is received by the communication unit 9 via the mobile phone 3 at A15 (A15: YES), the control unit 5 controls the display unit 13 to erase the sever result waiting message and the server result waiting icon 33m. Then, the control unit 5 controls the display unit 13 to display candidates obtained based on the second recognition result of the server 4 in the candidate display region 33b of the recognition result window 33 at A16. In this case, the size of the candidate display region 33b is enlarged to have the same size with the size of the candidate display region 32b. The candidates obtained based on the second recognition result are also referred to as a second candidate group.

Figure 8:
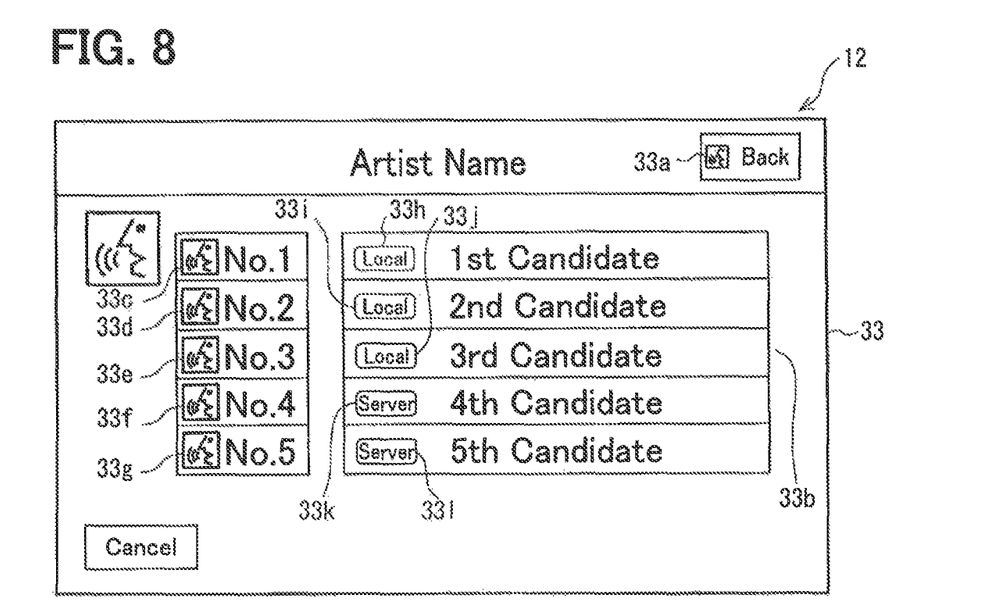
FIG. 8 is a diagram showing an exemplary recognition result window.

As shown in FIG. 8, when the control unit 5 already controlled the display unit 13 to display from the first candidate to the third candidate obtained based on the first recognition result of the speech recognition unit 11 in the candidate display region 33b of the recognition result window 33, the control unit 5 extracts two candidates from the candidates obtained based on the second recognition result of the server 4 so that the two candidates have top two likelihood levels. Further, the two candidates are extracted so that the two candidates are different from the first candidate to the third candidate extracted based on the first recognition result of the in-vehicle navigation apparatus 2. Then, the control unit 5 defines a fourth and a fifth candidates in a decreasing order of the likelihood levels of the two candidates, and displays the fourth and the fifth candidates in the enlarged candidate display region 33b of the recognition result window 33. Then, the control unit 5 controls the display unit 13 to additionally display selection icons 33f, 33g and server icons 33k, 33l. Each of the selection icons 33f, 33g notifies to the user that the user can make a speech of selecting a corresponding candidate. Each of the server icons 33k, 33l notifies to the user that the corresponding candidate is obtained by the speech recognition unit 22 of the server 4. The server icons 33k and 33l correspond to second identification information, which indicate that the candidates are obtained from the speech recognition unit 22 of the server 4.

Figure 9:
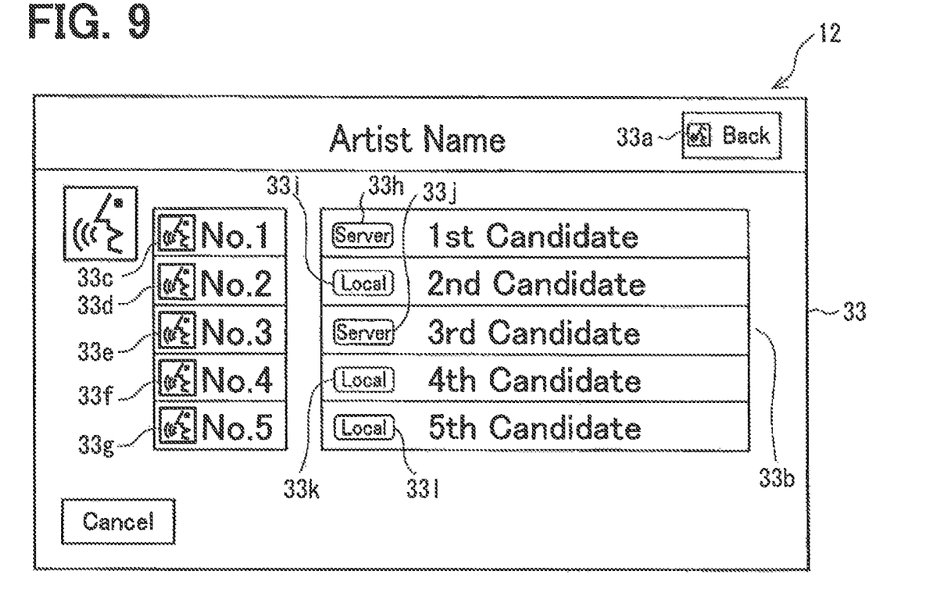
FIG. 9 is a diagram showing an exemplary recognition result window.
Figure 10:
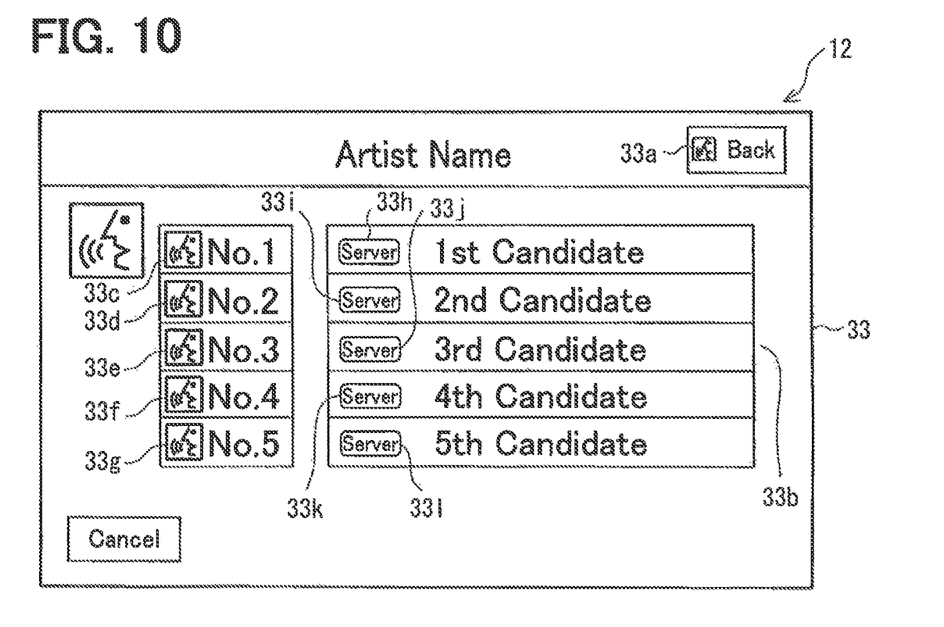
FIG. 10 is a diagram showing an exemplary recognition result window.
Figure 11:
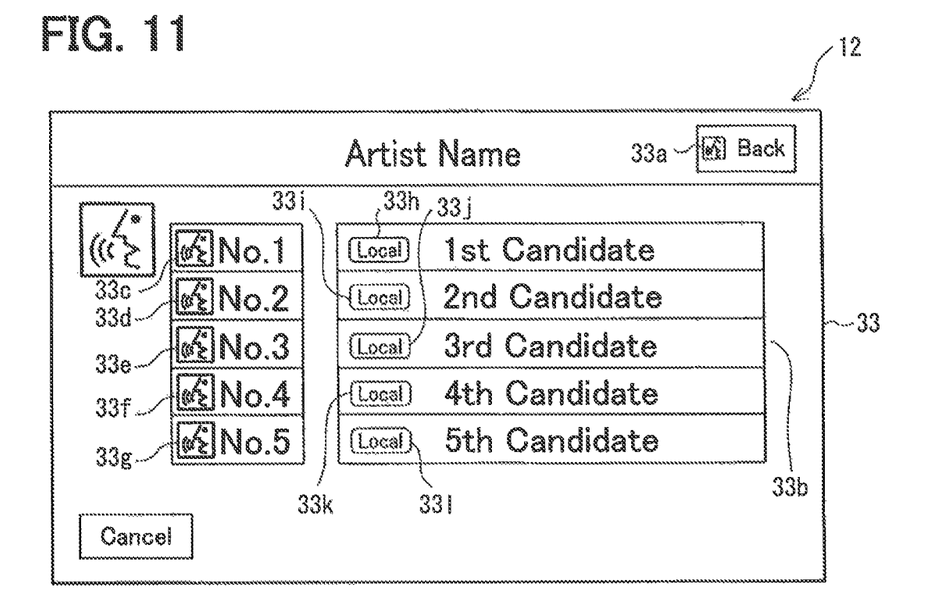
FIG. 11 is a diagram showing an exemplary recognition result window.

Further, as shown in FIG. 9 to FIG. 11, when the control unit 5 are able to obtain the likelihood levels of the candidates included in the second candidate group, the control unit 5 may reorder all the candidates obtained based on the first recognition result and the second recognition result in a decreasing order of the likelihood levels of all the candidates. Then, the control unit 5 defines from the first candidate to the fifth candidate in a decreasing order of the likelihood levels of all the candidates, and displays the first candidate to the fifth candidate in the candidate display region 33b of the recognition result window 33.

FIG. 9 shows an exemplary case in which the candidates, which have top five likelihood levels, are obtained based on both the first recognition result and the second recognition result. In this case, the control unit 5 controls the display unit 13 to display the candidates in a decreasing order of the likelihood levels in the candidate display region 33b of the recognition result window 33 in a mixed manner. FIG. 10 shows an exemplary case in which all the candidates, which have top five likelihood levels, are obtained based on the second recognition result. In this case, the control unit 5 controls the display unit 13 to display only the candidates obtained based on the second recognition result in a decreasing order of the likelihood levels in the candidate display region 33b of the recognition result window 33. FIG. 11 shows an exemplary case in which all the candidates, which have top five likelihood levels, are obtained based on the first recognition result. In this case, the control unit 5 controls the display unit 13 to display only the candidates obtained based on the first recognition result in a decreasing order of the likelihood levels in the candidate display region 33b of the recognition result window 33.

When the control unit 5 determines that the likelihood level of the first candidate is lower than the second predetermined level at A13 (A13: NO), the control unit 5 controls the display unit 13 to display the sever result waiting message until the control unit 5 receives the second recognition result from the server 4 at A17.

Figure 12:
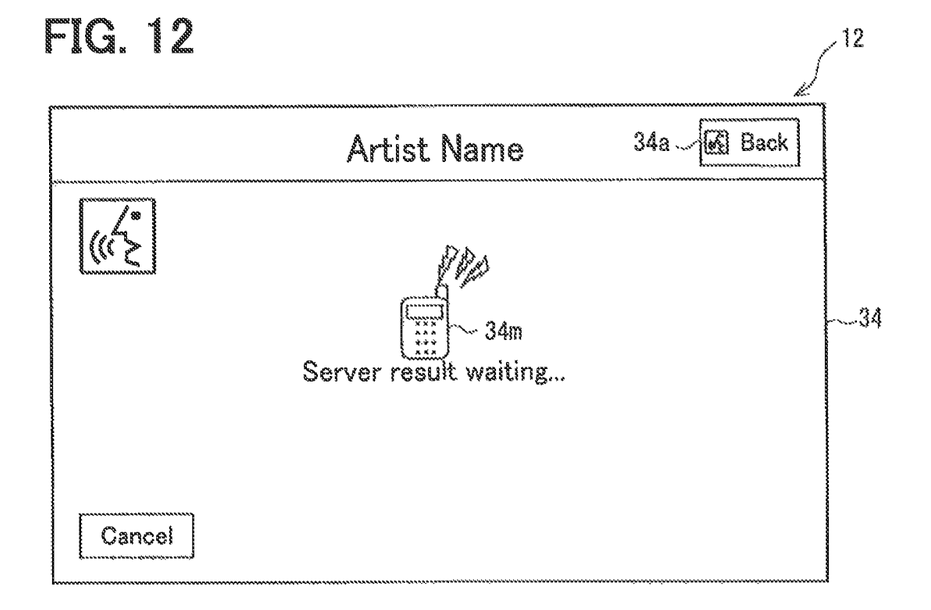
FIG. 12 is a diagram showing an exemplary recognition result window.

At A17, the control unit 5 controls the display unit 13 to display the sever result waiting message and a server result waiting icon 34m in a recognition result window 34. The control unit 5 may control the display unit 13 to display only one of the sever result waiting message and the server result waiting icon 34m. Further, the control unit 5 controls the display unit 13 to display a back icon 34a, which notifies to the user that the user can make a speech of going back to the previous window.

When the control unit 5 determines that the second recognition result output from the speech recognition unit 22 of the server 4 is received by the communication unit 9 via the mobile phone 3 at A18 (A18: YES), the control unit 5 controls the display unit 13 to erase the sever result waiting message and the server result waiting icon 34m. Then, the control nit 5 controls the display unit 13 to display only candidates obtained based on the second recognition result of the server 4 in a candidate display region 34b of the recognition result window 34 at A19.

Figure 13:
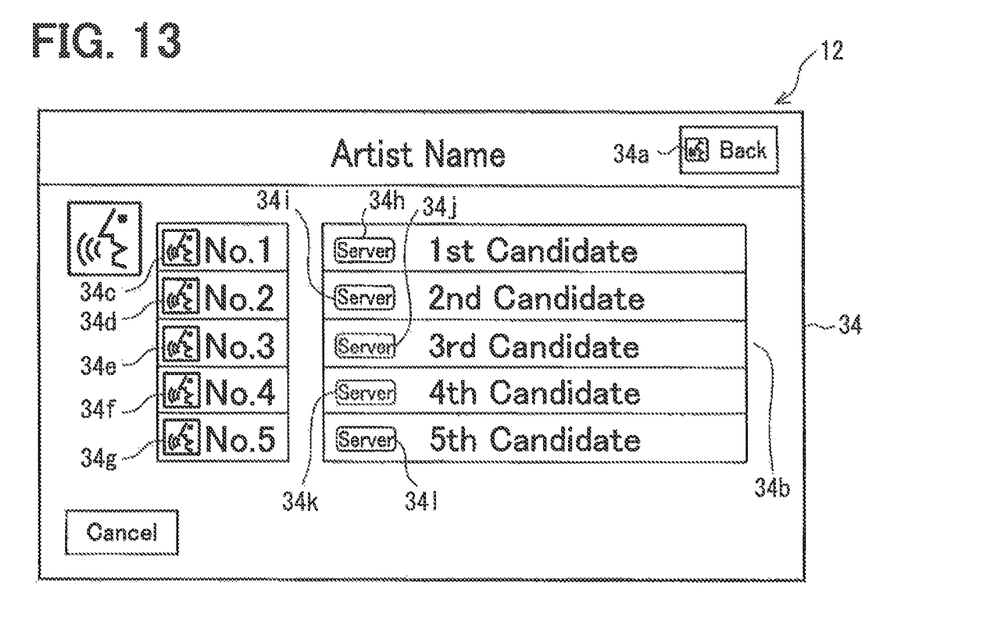
FIG. 13 is a diagram showing an exemplary recognition result window.

Specifically, as shown in FIG. 13, when the control unit 5 determines that the second recognition result from the server 4 is received and the number of the candidates obtained based on the second recognition result is equal to or more than five, the control unit 5 extracts five candidates from all of the candidates so that the five candidates have top five likelihood levels. Then, the control unit 5 defines the first candidate to the fifth candidate in a decreasing order of the likelihood levels, and controls the display unit 13 to display the first to fifth candidates in the candidate display region 34b of the recognition result window 34. Further, the control unit 5 controls the display unit 13 to display a back icon 34a, selection icons 34c to 34g, and server icons 34h to 34l. The back icon 34a notifies to the user that the user can make a speech of going back to the previous window. Each of the selection icons 34c to 34g notifies to the user that the user can make a speech of selecting a corresponding candidate. Each of the server icons 34h to 34l notifies to the user that the corresponding candidate is obtained by the speech recognition unit 22 of the server 4. Further, when the number of the candidates is less than five, the control unit 5 defines from the first candidate to the last candidate in a decreasing order of the likelihood levels. Then, the first candidate to the last candidate are displayed in the candidate display region 34b of the recognition result window 34. Then, when the control unit 5 determines that the speech of selecting the corresponding candidate, which is made by the user, is input to the speech input unit 10, the control unit 5 selects the corresponding candidate, and the speech recognition process executed by the control unit 5 of the in-vehicle navigation apparatus 2 ends.

Figure 4:
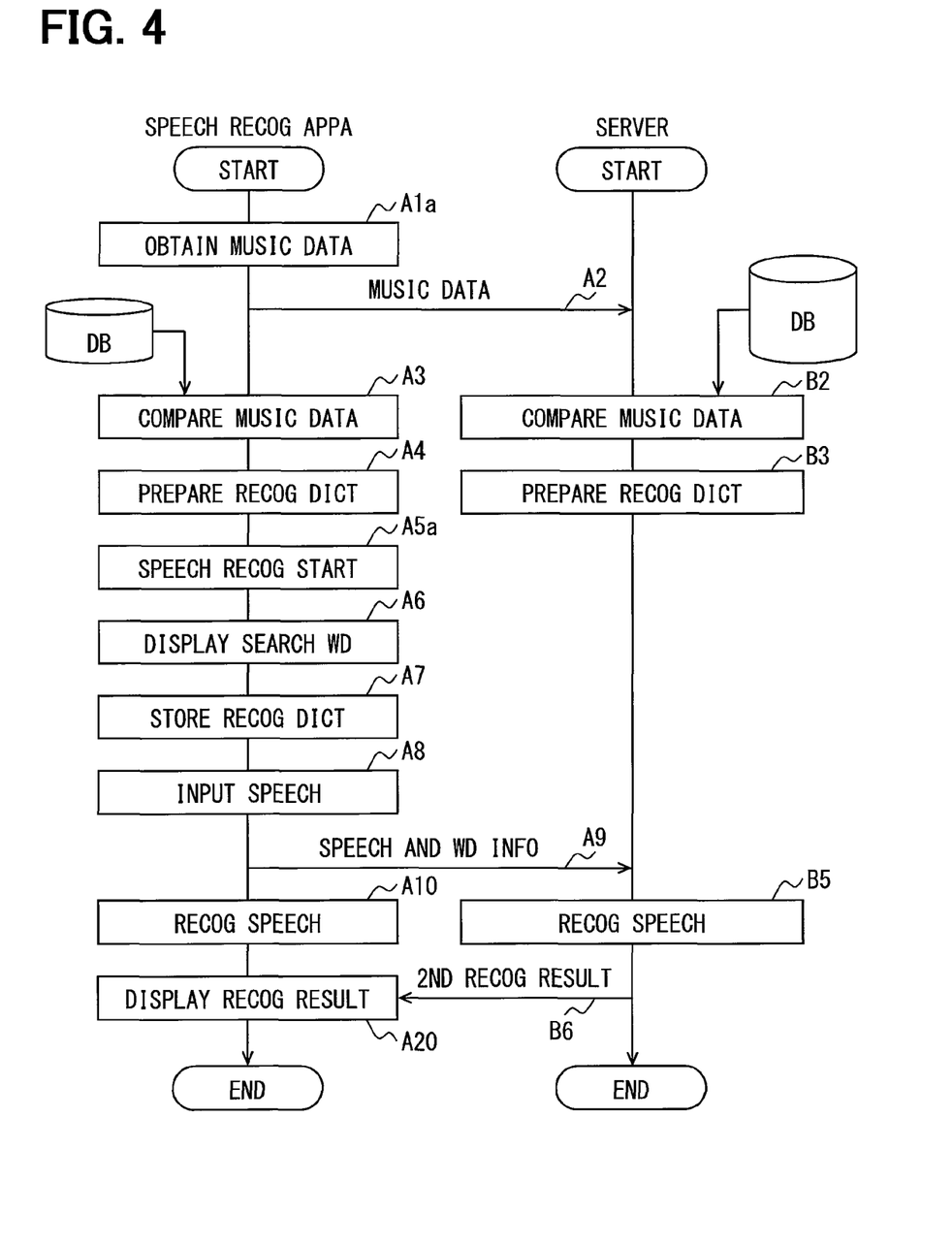
FIG. 4 is a sequence diagram of the speech recognition processes executed by the speech recognition apparatus and the server.

The following will describe a case where the music data is transmitted from the music play terminal 16 to the in-vehicle navigation apparatus 2 and the speech recognition manipulation is input by the user to the in-vehicle navigation apparatus 2 with reference to FIG. 4.

As shown in FIG. 4, when the in-vehicle navigation apparatus 2 obtains the music data at A1a, the in-vehicle navigation apparatus 2 transmits the obtained music data to the server 4 at A2. At A3, the in-vehicle navigation apparatus 2 compares the obtained music data with the music data stored in the music database 7 and performs G2P conversion to the obtained music data when the obtained music data is the same with the stored music data. At A4, the in-vehicle navigation apparatus 2 stores the converted phoneme string in the first recognition dictionary. At A5a, the in-vehicle navigation apparatus 2 starts the speech recognition in response to the speech recognition manipulation input by the user. Processes executed at A6 to A10 are similar to the processes shown in FIG. 2. At A20, the in-vehicle navigation apparatus 2 properly displays at least one of the first recognition result output from the in-vehicle navigation apparatus 2 or the second recognition result output from the server 4. The server 4 starts the speech recognition process when the music data is transmitted from the in-vehicle navigation apparatus 2. In FIG. 4, processes executed at B2, B3, B5, B6 by the server 4 are similar to the processes shown in FIG. 3.

As described above, according to the present embodiment, in the speech recognition apparatus that is applied to the in-vehicle navigation apparatus 2, the control unit 5 determines the likelihood level of the first candidate obtained based on the first recognition result. Then, based on a determination result of the likelihood level of the first candidate, the control unit 5 controls the display unit 13 to display the candidates obtained based on the first recognition result and the candidates obtained based on the second recognition result. With this configuration, the speech recognition apparatus can provide the candidates obtained based on the second recognition result, which has the higher recognition accuracy than the first recognition result of the speech recognition unit 11. Further, when the control unit 5 determines to display the candidates obtained based on the first recognition result, that is, when the likelihood level of the first candidate is equal to or higher than the first predetermined level or the likelihood level of the first candidate is lower than the first predetermined level and equal to or higher than the second predetermined level, the control unit 5 controls the display unit 13 to display the candidates obtained based on the first recognition result irrespective of whether the second recognition result is received from the server 4. With this configuration, the speech recognition apparatus can provide the candidates obtained based on the first recognition result at a high speed.

The control unit 5 controls the display unit 13 to display the local icons indicating that candidates are obtained from the speech recognition unit 11 of the speech recognition apparatus and the server icons indicating that the candidates are obtained from the speech recognition unit 22 of the server 4. Thus, a providing source of each candidate is provided to the user.

When the first candidate obtained based on the first recognition result of the speech recognition unit 11 has the likelihood level equal to or higher than the first predetermined level, the control unit 5 controls the display unit 13 to display five candidates that have top five likelihood levels. Thus, the speech recognition apparatus can provide the candidates obtained based on the first recognition result at a high speed.

When the first candidate obtained based on the first recognition result has the likelihood level lower than the first predetermined level and equal to or higher than the second predetermined level, the control unit 5 controls the display unit 13 to display three candidates that have top three likelihood levels based on the first recognition result. Further, the control unit 5 controls the display unit 13 to display two candidates that have top two likelihood levels based on the second recognition result. Thus, the speech recognition apparatus can provide the candidates obtained based on the first recognition result at a high speed and also can provide the candidates obtained based on the second recognition result that has the higher recognition accuracy than the first recognition result. Further, after the control unit 5 determines the likelihood level of the first candidate obtained based on the first recognition result, the control unit 5 controls the display unit 13 to display at least one of the sever result waiting message and the server result waiting icon until the control unit 5 receives the second recognition result from the server 4. Thus, the user is notified that the speech recognition apparatus is in a waiting state for the second recognition result from the server 4.

When the candidates obtained based on both the first recognition result and the second recognition result are displayed together, the candidates obtained based on the first recognition result may be separated from the candidates obtained based on the second recognition result on the recognition result window 33 as shown in FIG. 8. In this case, the user can easily identify the candidates obtained based on the first recognition result of the speech recognition unit 11 and the candidates obtained based on the second recognition result of the server 4.

When the candidates obtained based on both the first recognition result and the second recognition result are displayed together, the candidates obtained based on the first recognition result and the second recognition result may also be reordered based on the likelihood levels. In the present embodiment, the candidates obtained based on the first recognition result and the second recognition result are reordered in a decreasing order of the likelihood levels and displayed on the recognition result window 33 in a mixed manner in a decreasing order of the likelihood levels as shown in FIG. 9.

When the first candidate obtained based on the first recognition result has the likelihood level lower than the second predetermined level, the control unit 5 controls the display unit 13 to display five candidates that have top five likelihood levels and are obtained based on the second recognition result. Thus, the speech recognition apparatus can provide the candidates obtained based on the second recognition result that has the higher recognition accuracy than the first recognition result. In this case, after the control unit 5 determines the likelihood level of the first candidate obtained based on the first recognition result, the control unit 5 controls the display unit 13 to display at least one of the sever result waiting message and the server result waiting icon until the control unit 5 receives the second recognition result from the server 4 as shown in FIG. 12. Thus, the user is notified that the speech recognition apparatus is in the waiting state for the second recognition result from the server 4.

(Other Embodiments)

In the present embodiment, the speech recognition apparatus is applied to the in-vehicle navigation apparatus 2. Further, the speech recognition apparatus may be applied to an in-vehicle apparatus other than the in-vehicle navigation apparatus 2. Further, the speech recognition apparatus may also be applied to an audio apparatus that is used in a residence or in a building other than the in-vehicle apparatus.

The text data used to prepare the recognition dictionary are not limited to the music data. The text data may include facility name data, place name data, phonebook record data and the like. In the server 4, the second recognition dictionary is prepared by converting the music data received from the in-vehicle navigation apparatus 2 to the phoneme string. Further, the second recognition dictionary may be preliminarily prepared by converting all the music data stored in the music database 20 to corresponding phoneme strings. In this case, when the speech recognition is performed based on the second recognition dictionary that includes the phoneme strings converted from all the music data stored in the music database 20, a recognition accuracy may be decreased. Thus, phoneme string corresponding to the music data received from the in-vehicle navigation apparatus 2 may be extracted from all the phoneme strings in order to limit the decrease in recognition accuracy. Further, when the music data is not received from the in-vehicle navigation apparatus 2, the speech recognition may be performed based on all the music data stored in the music database 20.

In the foregoing embodiments, the in-vehicle navigation apparatus 2 transmits the text data to the server 4. Further, the in-vehicle navigation apparatus 2 and the server 4 may be configured to support the same standard such as ID3, which is known as a standard that allows storing an artist name and a title in a MP3 format file. In this case, the in-vehicle navigation apparatus 2 transmits only an identification (ID) of the standard to the server 4. In this case, in the in-vehicle navigation apparatus 2 and the server 4, the text data corresponding to the ID of the standard is extracted and is converted to the phoneme string to prepare the first and the second recognition dictionaries. When using the ID instead of the text data, the music data is not necessarily obtained from the music play terminal 16. Further, the ID may be obtained from a storage media such as a compact disk (CD) (registered trademark), and the ID is transmitted to the server 4. In a case where the user expects to prioritize the candidates obtained based on the first recognition result of the speech recognition unit 11, the user may set the first predetermined level and the second predetermined level lower than the first predetermined level and the second predetermined level set in a normal case. That is, when the user expects to get the candidates at a high speed, the user may set the first predetermined level and the second predetermined level lower than the first predetermined level and the second predetermined level set in a normal case. In a case where the user expects to prioritize the candidates obtained based on the second recognition result of the speech recognition unit 22, the user may set the first predetermined level and the second predetermined level higher than the first predetermined level and the second predetermined level set in a normal case. That is, when the user expects to get the candidates having high accuracies, the user may set the first predetermined level and the second predetermined level higher than the first predetermined level and the second predetermined level set in a normal case.

Further, the number of the candidates is not limited to five. That is, the number of the candidates is settable.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A speech recognition apparatus comprising:
a local database storing a plurality of local text data;
a text data obtaining unit that obtains a plurality of subject text data from an external device;
a text data transmission unit that transmits the plurality of subject text data to a server;
a first recognition dictionary that stores a plurality of first phoneme strings, which are respectively converted from the plurality of subject text data;
a recognition dictionary preparation unit that prepares the first recognition dictionary by:
respectively converting the plurality of subject text data to the plurality of first phoneme strings when each of the plurality of subject text data is equal to one of the plurality of local text data stored in the local database, and
storing the plurality of first phoneme strings in the first recognition dictionary;
a speech input unit that inputs a speech made by a user;
a speech recognition unit that recognizes the speech by referring to the first recognition dictionary and outputs a first recognition result;
a speech transmission unit that transmits the speech to the server, which includes a second recognition dictionary that stores a plurality of second phoneme strings respectively converted from the plurality of subject text data, the server recognizing the speech by referring to the second recognition dictionary and outputting a second recognition result;
a recognition result receipt unit that receives the second recognition result from the server; and
a control unit that determines a likelihood level of a selected candidate obtained based on the first recognition result, and controls an output unit to output at least one of the first recognition result or the second recognition result based on a determination result of the likelihood level of the selected candidate,
wherein the server includes a server database storing a plurality of server text data, an amount of the server text data stored in the server database being larger than an amount of the local text data stored in the local database;
wherein the server:
converts each of the subject text data received from the text data transmission unit to one of the plurality of second phoneme strings when each of the subject text data is equal to one of the plurality of server text data stored in the server database, and
stores the plurality of second phoneme strings in the second recognition dictionary; and
wherein, when the likelihood level of the selected candidate is equal to or higher than a threshold level, the control unit controls the output unit to output the first recognition result irrespective of whether the recognition result receipt unit receives the second recognition result from the server.

2. The speech recognition apparatus according to claim 1, wherein a likelihood level of a corresponding candidate obtained based on the first recognition result or the second recognition result is a unique feature of the corresponding candidate, and indicates a recognition accuracy of the corresponding candidate.

3. The speech recognition apparatus according to claim 1, wherein, the control unit controls the output unit to output at least one of a first identification information and a second identification information corresponding to the at least one of the first recognition result and the second recognition result,
wherein the first identification information indicates that the first recognition result is output from the speech recognition unit, and
wherein the second identification information indicates that the second recognition result is output from the server.

4. The speech recognition apparatus according to claim 1, wherein, when the control unit determines that the likelihood level of the selected candidate is equal to or higher than the threshold level, the control unit controls the output unit to output only the first recognition result.

5. The speech recognition apparatus according to claim 1, wherein the threshold level is referred to as a first predetermined level,
wherein, when the control unit determines that the likelihood level of the selected candidate is lower than the first predetermined level and equal to or higher than a second predetermined level, the control unit controls the output unit to output both the first recognition result and the second recognition result, and
wherein the second predetermined level is lower than the first predetermined level.

6. The speech recognition apparatus according to claim 5, wherein the control unit controls the output unit to output the first recognition result in first, and then the control unit controls the output unit to additionally output the second recognition result together with the first recognition result when the recognition result receipt unit receives the second recognition result from the server.

7. The speech recognition apparatus according to claim 6, wherein, after the control unit determines that the likelihood level of the selected candidate is lower than the first predetermined level and equal to or higher than the second predetermined level, the control unit controls the output unit to notify to the user that the control unit is in a waiting state for the second recognition result from the server until the recognition result receipt unit receives the second recognition result from the server.

8. The speech recognition apparatus according to claim 5,
wherein the control unit controls the output unit to output a first candidate group obtained based on the first recognition result and a second candidate group obtained based on the second recognition result,
wherein the first candidate group includes one or more first candidates including the selected candidate, and the second candidate group includes one or more second candidates, and
wherein the control unit controls the output unit to respectively output the first candidate group and the second candidate group irrespective of likelihood levels of the first candidates and the second candidates.

9. The speech recognition apparatus according to claim 5,
wherein the control unit controls the output unit to output a first candidate group obtained based on the first recognition result and a second candidate group obtained based on the second recognition result,
wherein the first candidate group includes one or more first candidates including the selected candidate, and the second candidate group includes one or more second candidates, and
wherein the control unit controls the output unit to output the first candidates and the second candidates in a decreasing order of likelihood levels of the first candidates and the second candidates.

10. The speech recognition apparatus according to claim 5,
wherein, when the control unit determines that the likelihood level of the selected candidate is lower than the second predetermined level, the control unit controls the output unit to output only the second recognition result.

11. The speech recognition apparatus according to claim 10,
wherein the control unit controls the output unit to output only the second recognition result when the recognition result receipt unit receives the second recognition result from the server.

12. The speech recognition apparatus according to claim 11,
wherein, after the control unit determines that the likelihood level of the selected candidate is lower than the second predetermined level, the control unit controls the output unit to notify to the user that the control unit is in a waiting state for the second recognition result from the server until the recognition result receipt unit receives the second recognition result from the server.

13. The speech recognition apparatus according to claim 1,
wherein the likelihood level of the selected candidate has a maximum value.

* * * * *